United States Patent Office 2,994,351
Patented Aug. 1, 1961

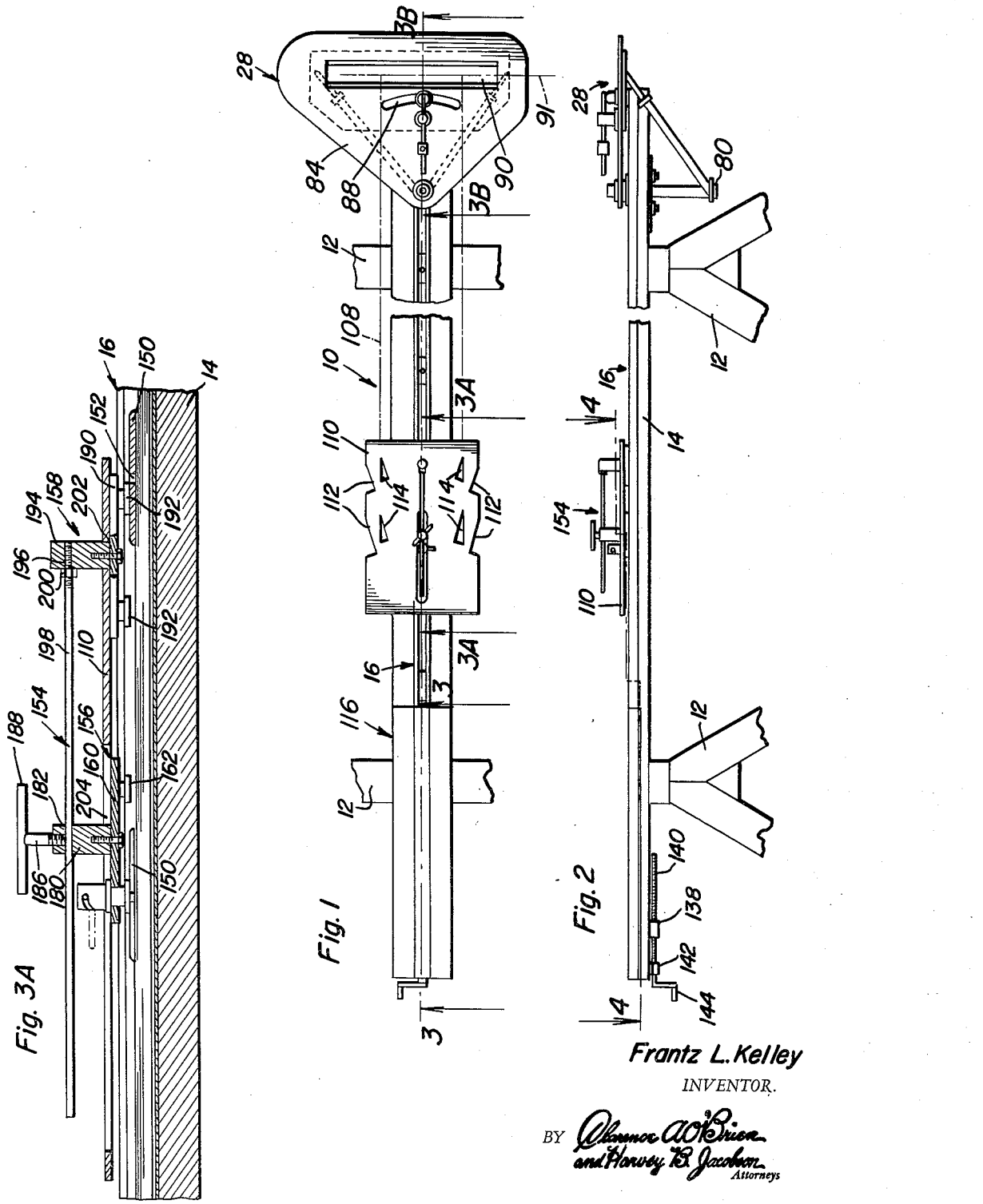

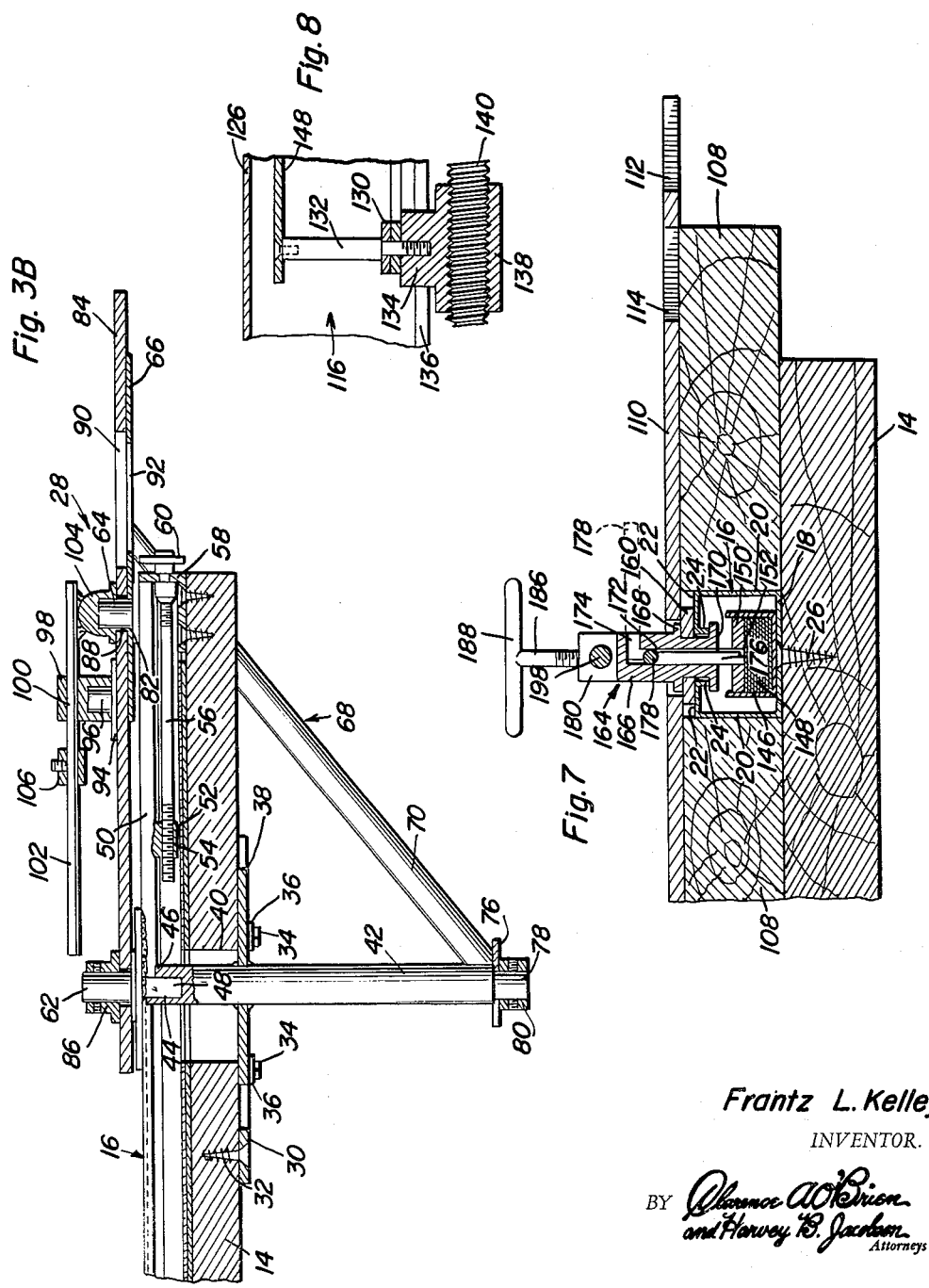

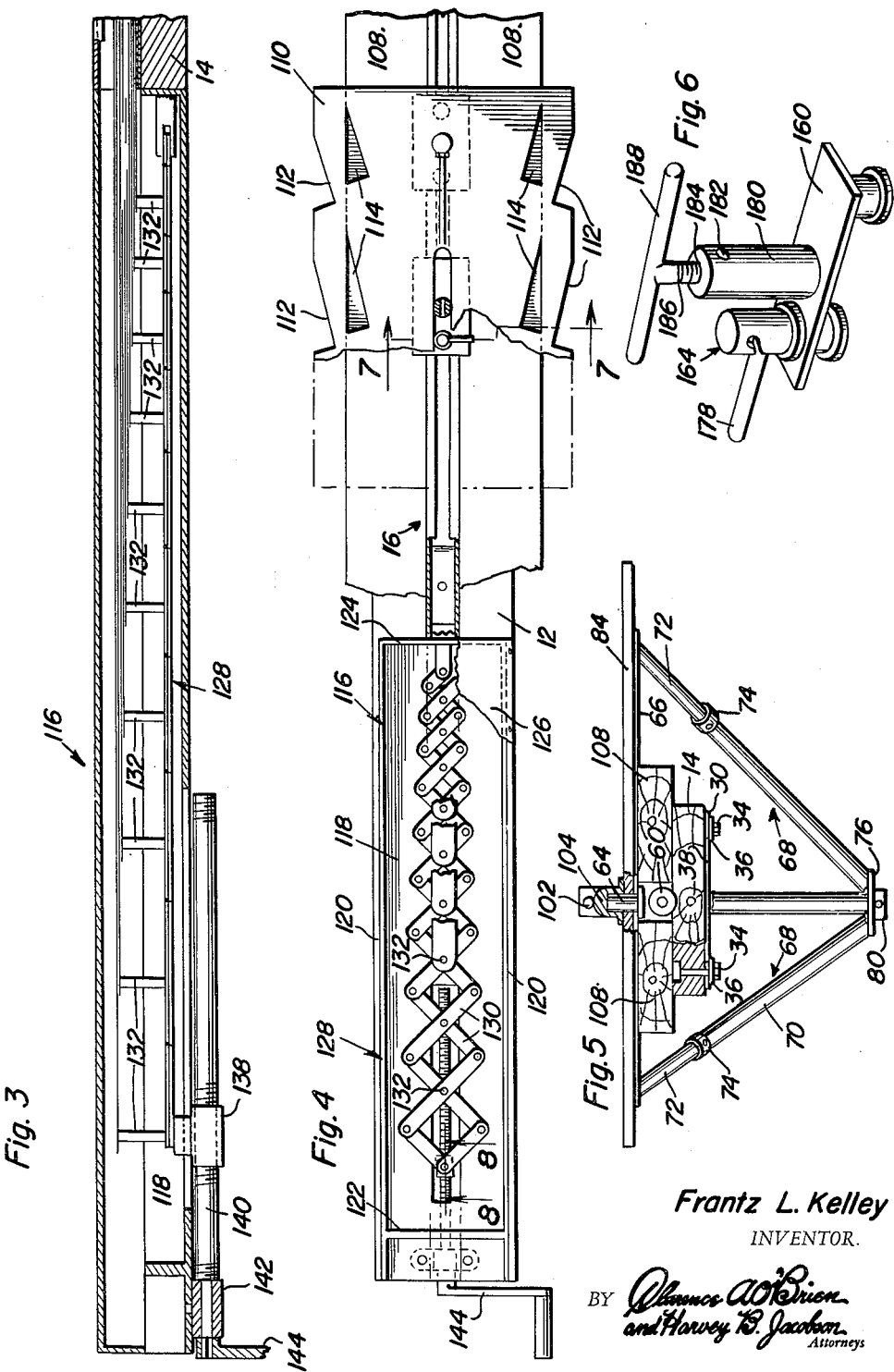

**2,994,351
RAFTER CUTTING JIG**
Frantz L. Kelley, % Davis Motel, Newman, Ill.
Filed Dec. 12, 1958, Ser. No. 780,007
6 Claims. (Cl. 143—175)

This invention relates in general to new and useful improvements in carpenter accessories, and more specifically to a jig for cutting rafters.

The average carpenter, particularly the young carpenter does not have sufficient training to properly figure and cut rafters. Furthermore, even should the carpenter have the desired training, the figuring of the rafters is time consuming. In addition to this, in most instances, rafters are repeated in a house and therefore it is highly desirable to provide a jig which may be used for the repetitious cutting of rafters so that all of the rafters will be identical.

It is therefore the primary object of this invention to provide a rafter cutting jig of such a nature that once the pitch and length of the rafter is ascertained, the jig may be readily set so that the desired rafter may be cut.

Another object of this invention is to provide an improved rafter cutting jig which is provided at one end thereof with a fan-like assembly for cutting the ridge end of a rafter, and an intermediate part of the jig is provided with a template for marking the notch in the opposite end of the rafter whereby in one continuous operation the rafter may have the ridge end thereof cut and the necessary outline of the notch in the lower end thereof drawn so that the rafter may be finally cut with accuracy.

Another object of this invention is to provide an improved rafter cutting jig provided at one end thereof with a fan assembly adapted to receive a power saw whereby the cutting of a rafter may be expeditiously completed and at the same time, when necessary, the power saw blade may be disposed at the desired angle to cut jack rafters.

Still another object of this invention is to provide an improved rafter cutting jig provided with a template for marking the notch to be cut in the lower part of the rafter, the rafter cutting jig including a track and a carriage, the carriage supporting the template, and there being supports for the carriage at intervals equal to 16 inches horizontal run plus the gain in rafter pitch (example 2/12 pitch 16 inches horizontal run plus .22 inch gain in rafter pitch equals 16.22 inches) these supports being movable to compensate for the variation pitch of rafters whereby rafters of all pitches may be readily cut.

A further object of this invention is to provide a rafter cutting jig which includes a template for outlining the notch required at the lower end of a rafter, the rafter cutting jig including a lazy tong assembly to which there are attached a plurality of support members, the support members being in the form of guide positioning members and are disposed in a track with their ends spaced apart at distances corresponding to 16 inches horizontal run plus the gain in rafter pitch and the lazy tong assembly being formed by a plurality of crossed links which increase in length so that as the lazy tong assembly is actuated, the spacing between the ends of the support members proportionately varies to compensate for the variation in the slope of the rafter.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the rafter cutting jig and shows generally the details thereof;

FIGURE 2 is a side elevational view of the rafter cutting jig mounted on suitable supports;

FIGURES 3, 3a (Sheet 1) and 3b (Sheet 3) are longitudinal section views taken substantially upon the section lines 3—3, 3a—3a and 3b—3b of FIGURE 1 and show further the specific details of the rafter cutting jig;

FIGURE 4 is an enlarged fragmentary horizontal sectional view taken substantially upon the plane indicated by the section line 4—4 of FIGURE 2 and shows the specific details of the lazy tong assembly and the relationship of the rafter notching template relative thereto;

FIGURE 5 is an enlarged end view of the rafter cutting jig as viewed from the right hand end thereof in FIGURE 1 and shows the details of the means for cutting the ridge end of a rafter;

FIGURE 6 is an enlarged perspective view of one section of the carriage for adjustably supporting the rafter notching template;

FIGURE 7 is an enlarged fragmentary transverse sectional view taken substantially upon the plane indicated by the section line 7—7 of FIGURE 4 and shows the manner in which the carriage for the template is releasably attached to the lazy tong assembly; and FIGURE 8 is an enlarged fragmentary longitudinal sectional view taken substantially upon the plane indicated by the section line 8—8 of FIGURE 4 and shows the manner in which the lazy tong assembly is adjusted.

Referring now to the drawings in detail, it will be seen that the rafter cutting jig which is the subject of this invention is referred to in general by the reference numeral 10. The rafter cutting jig 10 is illustrated as being mounted on a pair of saw horses 12 which are longitudinally spaced. However, any type of support may be used for the rafter cutting jig 10.

The main support member of the rafter cutting jig is referred to by the reference numeral 14 and may be in the form of a two-by-ten or similar member. Secured to the upper surface of the main support member 14 centrally thereof is a longitudinally extending channel shaped member which is referred to in general by the reference numeral 16 and which is best illustrated in FIGURE 7. The channel shaped member 16 includes a base 18, upstanding side flanges 20, inwardly directed top flanges 22 and depending upper flanges 24, the flanges 24 being disposed in spaced parallel relation. Extending through the base 18 is a plurality of screws 26 which secure the channel member 16 to the main support member 14. It is to be understood that the channel member 14 is in the form of a track.

Referring now to FIGURES 1, 3b and 5 in particular, it will be seen that secured to the right end of the main support member 14 is an assembly for cutting the ridge end of rafters, the assembly being referred to in general by the reference numeral 28. The assembly 28 includes a general C-shaped guide plate 30 which is secured to the underside of the main support member 14 by means of screws 32 and bolts 34. The bolts 34 pass through leg portions of the guide 30 and are provided with enlarged washers 36. Seated within the guide 30 is a plate 38 which has the edges thereof overlapped by the washers 36 so that the washers 36 retain the plate 38 within the guide 30.

Formed in the main support member 14 is an elongated opening 40 (FIGURE 3b). Secured to the plate 38 is an elongated support 42 which extends vertically through the main support member 14, the support 42 being disposed in the opening 40 for adjustment longitudinally of the main support member 14.

The support 42 is provided at the upper end thereof with a bore 44 which has a horizontal notch portion 46. Seated in the bore 44 is a pin 48 of a bar 50, the bar 50 having a portion seated in the notch portion 46. The bar 50 is guidingly disposed in the upper part of the trackway forming channel 16 and has depending from the central portion thereof a projection 52 which is provided with an internally threaded bore 54. Threadedly engaged in the bore 54 is a threaded portion of an adjusting screw 56 which passes through an end wall 58 provided for the channel 16. The adjusting screw 56 is provided with a handle 60 to facilitate the longitudinal positioning of the bar 50.

Extending upwardly from the bar 50 is a pair of spaced pins 62 and 64. The pin 62 functions as a pivot pin whereas the pin 64 functions as a guide pin.

A thin metal plate 66 has secured thereto a pair of downwardly forwardly converging support arms 68. The support arms 68, as is best illustrated in FIGURE 5, are formed in telescoping sections and include a lower section 70 and an upper section 72, the sections 70 and 72 being connected together in adjusted relation by means of collars 74. The lower ends of the lower sections 70 are secured to a fitting 76 which is positioned on a reduced lower portion 78 of the support 42. The fitting 76 is retained in place by means of a removable collar 80. The plate 66 is provided with an arcuate slot 82 (FIGURE 3b) receiving the pin 64.

Overlying the thin metal plate 66 is a second plate 84. The plate 84 is generally triangular in outline as is illustrated in FIGURE 1, and has secured thereto a collar 86 (FIGURE 3b) which is releasably mounted on the pin 62 so as to pivot about the pin 62. The plate 84 also has an arcuate opening 88 aligned with the arcuate opening 62 and receiving the pin 64. In addition to this, the plate 84 is provided with a large opening 90 of a size for receiving the base of a power saw cutting along line 91 as shown in FIG. 1. The opening 90 is aligned with a small opening 92 in the plate 66, the openings 90 and 92 receiving the base of the saw so that the saw may traverse in the openings to cut the rafter at the required angle, determined by the setting of the assembly 28.

Secured to the upper side of the plate 84 in the center thereof intermediate the collar 86 and the slot 88 is a plate 94 having an upstanding pin portion 96. Pivotally mounted on the pin portion 96 is a fitting 98 having a horizontal bore 100 therethrough. Slidably mounted in the bore 100 is a rod 102 which has secured to one end thereof a cap 104 for the pin 64. An adjustable collar 106 is mounted on the rod 102 for engagement with the fitting 98. When the plate 84 is swung about the pivot pin 62, the rod 102 and its associated parts will limit the swinging of the plate 84 to the desired angle. When this has been accomplished, the plate 84 is in position to form a guide for the power saw so that the ridge end of the rafter may be cut. It is to be understood that the plate 84 may be swung to the left or right. Thus two opposing rafters may be cut in two operations by merely swinging the plate 84 first to the right and then to the left with a cut being made in each position. As is illustrated in FIGURE 5, the rafters 108 to be cut are seated on the main support member 14 on opposite sides of the channel shaped trackway 16 and beneath the plates 66 and 84.

In order that the notches in the opposite end of the rafter may be readily cut, there is provided a rafter notching template 110. The rafter notching template 110 is in the form of a thin plate which has formed in opposite sides thereof cut-outs 112 and 114, the cut-outs 114 being disposed innermost and corresponding to a six-inch rafter whereas the cut-outs 112 are disposed outermost and correspond to the position of an eight-inch rafter. The template 110 is for one pitch rafter only and there will be provided a separate template 110 for each pitch of rafter.

In order that the template 110 may be automatically and accurately positioned in relation to the length of the rafter being cut, there is formed in one end of the main support member 14 a housing 116. The housing 116 is generally channel shaped in cross-section and includes a base 118 and upstanding side walls 120. The housing 116 also includes end walls 122 and 124 and a removable cover 126 (FIGURE 4).

Seated in the housing 116 is a lazy tong assembly which is referred to in general by the reference numeral 128. The lazy tong assembly 128 includes a plurality of pairs of cross links 130 which are connected together by pivot pins 132. It is to be noted from FIGURE 4 that the individual pairs of links 130 of the lazy tong assembly 128 decrease in length from left to right. Thus the pivot pins 132 are progressively closer together.

Referring now to FIGURES 3 and 8 in particular, it will be seen that carried by the pivot pin 132 at the end of the lazy tong assembly 128 is a depending block 134. The block 134 extends through an elongated slot 136 formed in the base 118 and is guided thereby. The block 134 also includes a horizontal internally threaded bore 138 in which there is threadedly engaged an adjusting screw 140. The adjusting screw 140 is carried for rotation only by means of a fitting 142 secured to the underside of the base 118. The adjusting screw 140 is provided with a handle 144 to facilitate the rotation thereof and the positioning of the lazy tong assembly 128.

Referring now to FIGURE 7 in particular, it will be seen that mounted within the channel shaped trackway 16 is a channel shaped guide member 146. Positioned in the guide member 146 in overlying relation is a plurality of straps 148 which may be considered either support members or guide positioning members. The straps 148 vary in length and have the left hand ends thereof connected to the associated pivot pins 132, as is best shown in FIGURE 8. The opposite ends of the straps 148 are spaced apart longitudinally of the rafter cutting jig 10 and terminate in enlarged portions 150. Each of the enlargements 150 is provided with a vertical bore 152. The bores 152 in the enlargements 150 are so spaced apart whereby the distance therebetween corresponds to 16 inch horizontal run plus the gain in rafter pitch. However, this distance is a horizontal distance and inasmuch as it will increase depending upon the pitch of the rafter, the distance between the bores 152 is always in excess of 16 inches horizontal run. The excess depends upon the pitch of the rafter and is set by means of the lazy tong assembly 128. Inasmuch as the lazy tong assembly 128 is of the progressive type, it will be seen that the spacing between adjacent bores 152 will be the same, but that there will be a progressive movement of the ends of the straps 148 so as to allow for the variation in pitch.

In order that the template 110 may be positioned, there is provided a carriage which is referred to in general by the reference numeral 154. The carriage 154 is formed in two sections, a first section 156 and a second section 158.

The first section 156 is in the form of a bar 160 which, as is best illustrated in FIGURE 7, overlies the channel-shaped trackway 16. Depending downwardly from the bar 160 adjacent the rear end thereof is a retaining fitting 162 having a reduced central portion which passes between the flanges 24 of the trackway 16 and an enlarged lower portion which underlies the flanges 24 to prevent the withdrawal of the fitting 62. Carried by the forward or left hand end of the bar 160 is a fitting which is best illustrated in FIGURE 7, the fitting being referred to in general by the reference numeral 164. The fitting 164 includes an upstanding portion 166 which is provided with an uppermost annular flange 168 overlying the bar 160 and a lowermost flange 170 which underlies the flanges 24 of the trackway 16. Extending through the upstanding portion 166 from the bottom thereof to a point adjacent the top thereof is a bore 172. The bore 172 terminates at the upper end thereof in a helical opening 174. Received in the bore 172 is a pin 176. Received in the helical opening 174 is a handle of the pin 176, two positions of the handle being shown at 178 in FIGURE 7. Thus by rotating the handle 178, the pin 176 may be raised or lowered. The pin 176 passes into the enlargement 150 of the associate one of the straps 148 and is received in the bore 152 thereof. Thus the carriage 162 may be releasably connected to one of the straps 148. This permits the template 110 to be secured to the proper strap 148 for the desired foot dimension of the rafter to be cut.

Also, carried by the bar 160 is a fitting 180 which extends upwardly above the fitting 164 and which has a longitudinally extending horizontal bore 182 (FIGURES 3a and 6). Intersecting the bore 182 is an internally threaded vertical bore 184 in which there is threadedly engaged a clamping screw 186 which has an enlarged handle 188.

The second section 158 of the carriage 154 includes a bar 190 which corresponds to the bar 160. Secured to the underside of the bar 190 is a pair of fittings 192 which correspond to the fittings 162. These fittings 192 mount the bar 190 for sliding movement only on the channel shaped trackway 16. Extending upwardly from the center of the bar 190 is a fitting 194 which has a horizontally disposed internally threaded bore 196 in which there is positioned one end of a rod 198. The rod 198 is threadedly engaged in the fitting 194 and is provided with a lock nut 200 for retaining it in connected position to the fitting 194.

The rod 198 is slidably received in the horizontal bore 182 of the fitting 180. This permits the carriage section 158 to be longitudinally adjusted relative to the carriage section 156.

The template 110 is provided with a bore 202 which receives the fitting 158. It is also provided with a slot 204 which receives the fitting 180. Thus the template 110 may be longitudinally adjusted together with the carriage section 158 relative to the carriage section 156. This adjustment permits the template 110 to be adjusted so that dimensions other than even feet may be provided for. In other words, if the horizontal span of a rafter is 10 feet 8 inches, then the carriage section 156 will be connected to the strap 148 corresponding to an eleven foot horizontal span and the carriage section 158 adjusted to the right 4 inches so as to compensate for the four inch shortness of the horizontal distance.

Inasmuch as the rafters to be cut underlie the template 110 at the time they are cut, immediately after the cut has been made, the desired notches may be outlined on the rafters after which they will be cut by hand. Furthermore, inasmuch as the notches are correlated with respect to the ridge angle of the rafters, the possibility of cutting the notches on the wrong side of the rafters is totally eliminated. After the rafters are cut at their ridge end, they may be reversed in the jig and correspondingly cut at their other end, if so desired.

From the foregoing description of the rafter cutting jig 10, it will be readily apparent that there has been devised a very simple rafter cutting jig which may be used by an average carpenter with a minimum of instruction and which is so constructed that once it is properly operated, the desired rafters may be cut with the assurance that they will be correct. Furthermore, once the rafter cutting jig has been adjusted, all like rafters may be cut identically.

When the common rafters are all cut and it is desired to change to jack rafters the following procedure may be adopted. For example, with the supports being set 16.22 inches apart for a 2/12 pitch for common rafters and the collar 106 set for the same pitch as that of the common rafters, the template 110 is moved one station towards the assembly 28. Next the angle of power saw blade is shifted from 90° to 45°. A predetermined dimension is taken from the length by operating screw 56 by handle 60 counterclockwise to the correct position. The jig is now ready to cut jack rafters. After cutting the necessary rafters of this length, the template 110 is moved one position forward and the necessary jack rafters are cut of this length. This operation may be repeated until the last jack rafters are cut.

The foregoing is considered as illustrative only of the principles of the invention. Further, since numerous modifications and changes may readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A rafter cutting jig comprising an elongated support, a track extending longitudinally of said support, a rafter notching guide slidably carried by said track, a plurality of guide positioning members for notching and cut-off tools disposed in said track for cutting rafters of different lengths, lazy tong means connected to said guide positioning members for varying the spacing between said guide positioning members to compensate for different rafter pitches, and means for actuating said lazy tong means, said lazy-tong means comprising a single lazy-tong assembly extending lengthwise of the track aligned with a central line parallel to the track and operatively connected to some of said guide positioning members so that the extension of said lazy-tongs assembly will extend the distances between guide positioning members according to the pitch of the rafters.

2. A rafter cutting jig comprising an elongated support, a track extending longitudinally of said support, a rafter notching guide slidably carried by said track, a plurality of guide positioning members for notching and cut-off tools disposed in said track for cutting rafters of different lengths, lazy tong means connected to said guide positioning members for varying the spacing between said guide positioning members to compensate for different rafter pitches, said lazy tong means having a plurality of central pivots, each of said guide positioning members being connected to one of said central pivots, and means for actuating said lazy tong means, said lazy-tong means comprising a single lazy-tong assembly lengthwise of the track with the pivots of said lazy-tongs assembly arranged in a central line parallel to the track, certain of said pivots being pinned, respectively, to certain of said notching and cut-off guide positioning members so the extension of said lazy-tongs assembly will extend the distances between guide positioning members according to the pitch of the rafters.

3. A rafter cutting jig comprising an elongated support, a track extending longitudinally of said support, a rafter notching guide slidably carried by said track, a plurality of guide positioning members for notching and cut-off tools disposed in said track for cutting rafters of different lengths, lazy tong means connected to said guide positioning members for varying the spacing between said guide positioning members to compensate for different rafter pitches, said lazy tong means having a plurality of central pivots, each of said guide positioning members being connected to one of said central pivots, said lazy tong means also including a plurality of pairs of crossed links of progressively varying lengths, and means for actuating said lazy tong means, said lazy-tong means comprising a single lazy-tong assembly extending lengthwise of the track with the pivots of said lazy-tongs assembly arranged in a central line parallel to the track, certain of said pivots being pinned, respectively, to certain of said notching and cut-off guide positioning members so the extension of said lazy-tongs assembly will extend the distances between guide positioning members according to the pitch of the rafters.

4. A rafter cutting jig comprising an elongated support, a track extending longitudinally of said support, a rafter notching guide slidably carried by said track, a plurality of guide positioning members for notching and cut-off tools disposed in said track for cutting rafters of different lengths, lazy tong means connected to said guide positioning members for varying the spacing between said guide positioning members to compensate for different rafter pitches, and means for actuating said lazy tong means, said lazy tong means being disposed within one end portion of said elongated support, said lazy-tong means comprising a single lazy-tong assembly extending lengthwise of the track aligned with a central line parallel to the track and operatively connected to some of said guide positioning members so that the extension of said lazy-tongs assembly will extend the distances between guide positioning members according to the pitch of the rafters.

5. A rafter cutting jig comprising an elongated support, a track extending longitudinally of said support, a rafter notching guide slidably carried by said track, a plurality of guide positioning members for notching and cut-off tools disposed in said track for cutting rafters of different lengths, lazy tong means connected to said guide positioning members for varying the spacing between said guide positioning members to compensate for different rafter pitches, means for actuating said lazy tong means, and a saw guide at the end of said elongated support remote from said rafter notching guide for cutting the desired ridge angle on a rafter, said lazy-tong means comprising a single lazy-tong assembly extending lengthwise of the track aligned with a central line parallel to the track and operatively connected to some of said guide positioning members so that the extension of said lazy-tongs assembly will extend the distances between guide positioning members according to the pitch of the rafters.

6. A rafter cutting jig comprising an elongated support, a track extending longitudinally of said support, a rafter notching guide slidably carried by said track, a plurality of guide positioning members for notching and cut-off tools disposed in said track for cutting rafters of different lengths, lazy tong means connected to said guide positioning members for varying the spacing between said guide positioning members to compensate for different rafter pitches, means for actuating said lazy tong means, said lazy tong means being disposed within one end portion of said elongated support, and a saw guide at the end of said elongated support remote from said rafter notching guide for cutting the desired ridge angle on a rafter, said lazy-tong means comprising a single lazy-tong assembly extending lengthwise of the track with the pivots of said lazy-tongs assembly arranged in a central line parallel to the track, certain of said pivots being pinned, respectively, to certain of said notching and cut-off guide positioning members so the extension of said lazy-tongs assembly will extend the distances between guide positioning members according to the pitch of the rafters.

References Cited in the file of this patent

UNITED STATES PATENTS

| | | |
|---|---|---|
| 326,454 | Rawlings | Sept. 15, 1885 |
| 2,630,146 | Van Tuyl | Mar. 3, 1953 |
| 2,662,563 | Grove | Dec. 15, 1953 |
| 2,821,028 | Godfrey | Jan. 28, 1958 |